United States Patent [19]

Beckmann et al.

[11] Patent Number: 4,952,460
[45] Date of Patent: Aug. 28, 1990

[54] PROCESS FOR THE PRODUCTION OF COMPOSITE SAFETY GLASS

[75] Inventors: Rolf Beckmann, Siegburg; Wilhelm Knackstedt, Hennef, both of Fed. Rep. of Germany

[73] Assignee: Dynamit Nobel AG, Troisdorf, Fed. Rep. of Germany

[21] Appl. No.: 367,912

[22] Filed: Jun. 16, 1989

Related U.S. Application Data

[63] Continuation of Ser. No. 114,180, Oct. 28, 1987, abandoned, which is a continuation of Ser. No. 2,088, Jan. 12, 1987, abandoned, which is a continuation of Ser. No. 843,892, Mar. 25, 1986, abandoned, which is a continuation of Ser. No. 206,511, Nov. 13, 1980, abandoned, which is a continuation of Ser. No. 13,934, Feb. 22, 1979, abandoned, which is a continuation of Ser. No. 847,275, Oct. 31, 1977, abandoned, which is a continuation-in-part of Ser. No. 738,402, Nov. 3, 1976, abandoned.

[30] Foreign Application Priority Data

| Nov. 5, 1975 | [DE] | Fed. Rep. of Germany | 2549474 |
| Oct. 30, 1976 | [DE] | Fed. Rep. of Germany | 2650119 |
| Oct. 30, 1976 | [DE] | Fed. Rep. of Germany | 2650120 |
| Oct. 30, 1976 | [DE] | Fed. Rep. of Germany | 2650118 |

[51] Int. Cl.$^5$ .............................................. B32B 17/06
[52] U.S. Cl. .................................... 428/429; 428/441; 428/442; 428/447
[58] Field of Search ................. 428/429, 441, 442, 447

[56] References Cited

U.S. PATENT DOCUMENTS

| 2,400,139 | 5/1946 | Roland | 428/441 |
| 3,395,069 | 7/1968 | Plueddemann | 428/429 |
| 3,622,440 | 11/1971 | Snedeker et al. | 428/442 |
| 3,666,614 | 5/1972 | Snedeker et al. | 428/429 |
| 4,144,376 | 3/1979 | Beckmann et al. | 428/429 |
| 4,277,538 | 7/1981 | Beckmann et al. | 428/429 |
| 4,303,739 | 12/1981 | Beckmann et al. | 428/429 |

*Primary Examiner*—William J. Van Balen
*Attorney, Agent, or Firm*—Sprung, Horn, Kramer & Woods

[57] ABSTRACT

An improvement in a method for manufacturing a composite safety glass wherein one or more silicate glass panes is bonded to a plasticized synthetic resin film at an elevated temperature, the improvement residing in employing as the plasticized synthetic resin film a soft film of a polymer of ethylene and/or propylene and effecting the bonding under pressure at a temperature of at least 120° C. and up to 200° C.

18 Claims, No Drawings

PROCESS FOR THE PRODUCTION OF COMPOSITE SAFETY GLASS

CROSS-REFERENCE TO RELATED APPLICATION

This is a continuation of application Ser. No. 114,180, filed 10-28-87, now abandoned.

BACKGROUND OF THE INVENTION

1. Field of the Invention

This invention relates to the production of composite safety glass by unilateral or bilateral bonding of one of more silicate glass panes to a plasticized soft film of an ethylene or propylene mono-, co- or terpolymer. More especially, this invention is directed to the manufacture of laminated safety glass by the bonding together of one or more sheets of silicate glass to a soft film of a polymer of ethylene or propylene.

2. Discussions of the Prior Art

There are many applications for laminated safety glass. It is used, for example, in the building industry for the production of doors or windows, bullet-proof glass and skylights, and in the automotive industry especially for the manufacture of windshields.

The term "laminated safety glass", as used herein, is to be understood to means a sandwich consisting of one or more silicate glass sheets bonded together in one unit with a film of organic material. If the glass is broken, the fragments adhere to the film. Loose, sharp-edged splinters are not formed (cf. DIN 1259, Sheet 2).

Laminated safety glass must satisfy certain quality requirements according to the purpose for which it is to be used. In the case of motor vehicles, these quality requirements are laid down in the "Strassenverkehr-szulassungsordnung" of the German Federal Republic, Section 22, No. 29, in "Motor Vehicle Safety Standards" Nos. 205 and 208, and in U.S.A. Standard Z 26.1-1966. Quality requirements for use in the building industry are established in "American National Standard Institute" Standard Z 97.1-1966, and for use as bullet-proof material they are specified in "Underwriters Laboratories" Standard 752.

In practice, the use of laminated safety glasses on the basis of silicate glass sheets bonded together with films of plasticized polyvinyl butyral has become widespread. However, the use of polyvinyl butyral films containing plasticizers makes the production of laminated safety glass very expensive.

Polyvinyl butyral films cannot generally be manufactured on the commonly available equipment such as is used for the production of other plastic films, and apparatus especially designed for this type of film must be used not only for the production of such films, but also for their incorporation into laminated safety glass. Certain special requirements must be satisfied. For example, the films have to be adjusted to certain specific moisture contents and to precise free hydroxyl group contents in order that the optimum adhesive strength desired for the particular application can be consistently achieved. On account of their sensitivity to moisture, polyvinyl butyral films must be handled under controlled atmospheric conditions in most cases, not only during their manufacture and storage, but also immediately prior to their incorporation into the laminated safety glass. It is also disadvantageous that polyvinyl butyral film containing plasticizer sticks to itself and therefore must first be provided with a parting means if they are to be stored or transported in the form of stacks of die-cut blanks or in the form of rolls.

It has been proposed to replace the plasticized polyvinyl butyral film with other organic adhesive materials. For example, it is proposed in German No. "Offenlegungsschrift" 1,421,142 that films of highly polymerized vinyl chloride be used as fire-retardant intermediate layers, to which vinyl chloride of a low degree of polymerization (K values under 50, preferably between 30 and 40) has been added for the achievement of adhesion to glass. The low polymers can also be applied to the surfaces of the glass sheets in the form of a thin, viscid coating before they are joined together. With adhesive films of this kind, approximately the same problems are encountered as in the preparation and use of polyvinyl butyral films.

In co-pending application Ser. No. 738,402, the disclosure of which is hereby incorporated by reference, it is proposed to obviate the afore-mentioned problems by employing as the film to which the silicate glass layers are bonded a plasticized polyvinyl chloride film. It has been discovered, in accordance with our invention as disclosed therein, that improved adhesion and shatter resistance are provided using a plasticized polyvinyl chloride film. The strength of adhesion is remarkably superior, according to the procedure therein, than has been obtained heretofore for composite safety glasses utilizing polyvinyl butyral. It has become desirable, however, to provide other forms of composite safety glass employing films other than those containing polyvinyl chloride. It has become particularly desirable to provide composite safety glass which is not only useful in the vehicle sector, but can be used in the construction sector as well for window panes, bullet-proof glass, window railings, partitions and the like. It has become especially desirable to provide such laminated safety glass which can take advantage of the properties of other synthetic resin films.

SUMMARY OF THE INVENTION

In accordance with the invention, there is now provided a further improvement in a method for manufacturing a laminated safety glass wherein at least one silicate glass sheet is bonded to a side of a plasticized synthetic resin film at an elevated temperature, the improvement residing in employing as the plasticized synthetic resin film a plasticized soft film of an ethylene or propylene polymer such as an ethylene or propylene homo-, co- or terpolymer.

Preferably, the soft films of this invention have a Shore A hardness value, as measured by Deutsche Industrie Norm (DIN) 53 505 of 40-98, more especially 50-95.

The ethylene and/or propylene copolymers generally have a molecular weight between 20,000 and 100,000, preferably between 30,000 and 60,000, the molecular weight being the number average molecular weight determined in o-dichloro benzene at 90° C. in a membrane osmometer. The melt flow index of the ethylene and/or propylene copolymers has values between 0.1 and 20 g/10 minutes determined according to DIN 53735.

The manufacture of films, according to this invention, having the desired Shore A hardness values is, per se, known. The manufacturing process is generally conducted with the aid of comonomers which are to be incorporated by polymerization and which behave as plasticizers.

Vinyl acetate can be mentioned, for example, as a plasticizing comonomer. Such copolymers of ethylene or propylene have the advantage over the plasticizer-containing, partially acetalized, polyvinyl alcohol films heretofore used as adhesive films between glass panes in that they exhibit a substantially greater low-temperature resistance under impact load.

Other suitable comonomers for producing the ethylene or propylene co- or terpolymers, etc., are olefinically unsaturated compounds, such as, for example, ethylene, propylene, butadiene, vinyl ethers, vinyl chloride, vinyl fluoride, acrylic acid, acrylic acid esters, e.g., ethyl acrylate, butyl acrylate, maleic anhydride, maleic acid esters, styrene, and the like, individually or in a mixture with one another.

One can also use the reaction products of these co- or terpolymers, produced, for example, by saponification reactions or neutralization reactions with metallic ions.

Mixtures of ethylene homopolymers or propylene homopolymers with ethylene copolymers or propylene copolymers and/or ethylene terpolymers or propylene terpolymers are also usable for the production of the films according to this invention.

The term "polymers of ethylene and/or of propylene" also includes mixtures wherein the polymer component consists of more than 50 percent by weight of the above-mentioned homopolymers and/or copolymers and/or terpolymers and, up to 100 percent by weight of the remainder, of other synthetic resins compatible with the aforementioned olefinic polymers.

For the plasticizing of such mixtures, one can use conventional plasticizers compatible with these polymers or polymer mixtures.

Clear-transparent films are preferred although, depending on the intended purpose of using the composite safety glass articles, it is also feasible to employ opaque films.

The following silanes can be utilized in accordance with the invention:

(a) Silanes or silane mixtures which increase the adhesive stength at the bond; and/or
(b) Silanes or silane mixtures which reduce the adhesive strength.

In general, silicon-organofunctional silanes effect an increase in the bond strength, whereas generally silicon-functional silanes lower the bond strength.

Silicon-functional silanes are understood to mean those wherein the functional groups, such as, for example, halogen or alkoxy groups, are linked directly to the Si atom. Such groups are, in general, readily hydrolyzed.

Silicon-organofunctional silanes are difunctional. In addition to at least one hydrolyzable group which is to react within the composite with the glass surface, there must be present at least one functional group which is bound to the silicon by way of one or more carbon atoms and which is reactive, for example due to amino or epoxy groups or due to double bonds.

Silicon-organofunctional silanes suitable along the lines of the present invention are, for example, those of the general Formula I

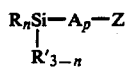   I wherein
R represents a hydrolyzable residue, such as Cl, OR" (R"=a $C_{1-8}$ alkyl residue, preferably of 1-4 carbon atoms, optionally containing hetero atoms, such as —O— or —S—, or an acyl residue),
R' represents an alkyl residue of 1-18 carbon atoms,
A represents a bivalent alkylene residue of 1-10 carbon atoms, preferably 2-6 carbon atoms, which can optionally be branched, and
Z represents a residue containing a functional group, wherein the functional group can be, for example

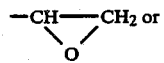

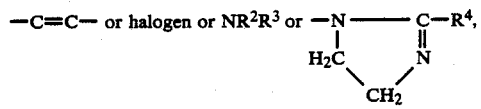

wherein $R^2$ is H or amino alkyl of 2-8 carbon atoms in the alkyl residue; and $R^3$ is H or $R^2$; and $R^4$ is H or $CH_3$ or $C_2H_5$; and n is 1 to 3, and p is 0 or 1.

Suitable aminosilanes are, for example, those of the Formula II

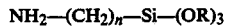   II wherein
n is 2 to 6 and
R is $C_{1-8}$ alkyl (branched or unbranched and optionally interrupted by O atoms, such as, for example, the —$CH_2$—$CH_2$—O—$CH_3$ residue).

Examples in this connection are γ-aminopropyl and -ethyltrialkoxysilanes wherein the hydrogen atoms of the amino group can optionally be substituted by an amino or polyamino alkyl residue (for example the residue [—$CH_2(CH_2NHCH_2)_xCH_2$—]$NH_2$, x=1 to 8).

Also suitable are β-aminoethyl-γ-hydroxypropylmethyldialkoxysilanes or polyaminotrialkoxysilanes, for instance [$(CH_3O)_3Si$—$(CH)_2$]—NH—$CH_2$—$(CH_2NHCH_2)_x$—$CH_2NH_2$ (x=1 to 8).

Suitable iminosilanes are, for example, those of the Formula III

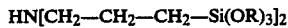   III wherein R has the same meanings as indicated in Formula II.

Especially worth mentioning are the γ-imidazolylpropyltrialkoxysilanes as described, for example, in DOS German Offenlegungsschrift No. 2,420,801, primarily γ-imidazolylpropyltriethoxysilane.

In the silanes containing epoxy groups, the epoxy group

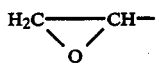

is linked to the alkylene silyl residue either by way of an ether group (—$CH_2$—O—) or by way of an ester group

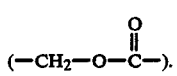

However, it is also possible that the epoxy group is linked directly or via a cycloaliphatic ring with the alkylene residue, or that the epoxy group is part of such a cycloaliphatic residue. The production of such silanes has been described in German Patent No. 1,061,321. The epoxy-group-containing silanes mentioned in this reference can likewise be used in accordance with this invention. Especially suitable silanes, containing ether bridges, are the glycidyloxypropyltrimethoxy-or -triethoxysilanes.

Among the epoxysilanes which contain ester bridges, worth mentioning is the compound

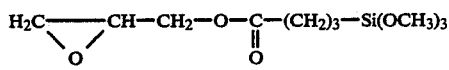

A suitable epoxysilane wherein the epoxy group is part of a cycloaliphatic ring is β-3,4-epoxycyclohexylethyltrimethoxysilane.

Among the aforementioned compounds, preferred silicon-organofunctional silanes which increase the bond strength are γ-imidazolypropyltriethoxysilane and γ-glycidyloxypropyltrimethoxysilane.

The silicon-organofunctional silanes with unsaturated —C=C— bonds, such as, for example, silanes which contain vinyl, propenyl, acryl, methacryl groups, which can be utilized in accordance with this invention, effect an increase in the bond strength only if they are used together with radical-forming agents. Without the addition of a radical-forming agent, the adhesive strength does not only remain the same, i.e. without any increase, but is even lowered to a minor extent.

Suitable radical-forming compounds are those customarily employed in the radical polymerization of olefinically unsaturated compounds, preferably peroxides, such as dicumyl peroxide.

The radical-forming agents are generally utilized in amounts of 0.01-1% by weight, preferably 0.01-0.5% by weight, based on the solvent or the varnish set forth below. Examples for these silanes are vinyltrialkoxysilanes, such as, for example, vinyltrimethoxysilane, vinyltriethoxysilane, γ-methacryloxypropyltrialkoxysilanes, especially the -trimethoxy- or -triethoxysilane, vinyl[tris-β-methoxy]ethoxysilane, vinyltriacetoxysilane, and the like.

In case of a composite safety glass wherein a very firm adhesion is desired between the silicate glass and the soft film, only silicon-organofunctional silanes are utilized according to this invention.

Such composite safety glasses with very good adhesion can be utilized, inter alia, in the construction sector, for example as window panes, bulletproof glass, or in window railings or partitions.

Composite safety glass having a specific adhesion within a medium range of the adhesion scale is used in the vehicle sector, for example, as glazing in automotive vehicles, rail vehicles, agricultural vehicles, ships, airplanes, etc.

In these fields of application, the adhesive strength adapted to the respective utilization can be provided by varying the type of silane and the quantity thereof. In this connection, it is, of course, necessary to consider also the adhesive strength of the respectively utilized, soft synthetic resin film which is not treated with the silane.

The bond strength of a glass pane bonded to a soft film of a polymer of ethylene and/or propylene in accordance with the invention is measured by the so-called "pummel adhesion value". The test to determine the pummel adhesion value is described in British No. 1,093,864. In accordance with the test, a test specimen, measuring approximately 150×300 mm, is refrigerated for about 2 to 8 hours at −18° C.±0.5° C., laid on a metal block tilted at an angle of about 45°, and hammered with a flat-faced hammer until the silicate glass is pulverized. The test surface size is about 100×150 mm. Adhesion is judged according to a scale from 0 to 10. These values are as follows:

| % exposed film surface | Pummel value |
| --- | --- |
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

Visual judgment is facilitated by the fact that illustrations are also provided on the scale opposite the pummel values. It has been found that this "non-quantitative" pummel test is entirely adequate in practice, and that adhesion can be judged with sufficient accuracy on the basis on visual appraisal.

In the examples that follow, the pummel adhesion value was determined at −20° C., +23° C. and +90° C.

By a combination of silanes increasing the bond strength and silanes diminishing the bond strength, one can, for example, provide a quite specific adhesive strength.

If the adhesive strength of a film, which is not treated with the silane, is too high for a certain purpose of use, then one can, for example, employ a silane or silane mixture to reduce the bond strength as the sole silane component, for example a silicon-functional silane or silane mixture.

According to the invention, silicon-functional silanes utilized herein are those of the general formula $R'_n$—Si—$R_{4-n'}$ wherein $R'$ represents identical or different, saturated, optionally branched alkyl residues of 1-18 carbon atoms, R represents halogen, preferably Cl, or identical or different saturated alkoxy groups of 1-8 carbon atoms optionally interrupted by hetero atoms, such as —O— or —S—, or an acyl residue linked to the Si atom via an oxygen atom, and wherein n is 1 to 3, n=1 being preferred.

Examples in this connection are the following: propyltriethoxysilane, propyltrimethoxysilane, isopropyldimethoxysilane, n-butyl- or isobutyltriethoxy- or -trimethoxysilane, isobutyltriacetoxysilane, and the like.

An advantageous embodiment of the process according to the invention resides in utilizing the silanes or silane mixtures dissolved in solvents, and to apply the thus-obtained solution by dipping, spraying, or similar simple methods to at least one of the respective boundary surfaces. After application, the solvents are removed before the individual layers are bonded together. This mode of operation can also be used according to this invention with the use of polyvinyl butyral films as the synthetic resin films.

It has been known from German Auslegeschrift (DAS) No. 2,410,153, to control the bond strength between plasticizer-containing, partially acetalized polyvinyl alcohol films and inorganic glasses by adding to the partially acetalized resin predetermined quantities of a silane before or during processing into a film. In this mode of operation, the silane is admixed to the resin in a separate process step; the silane is uniformly distributed throughout the entire resin. Thus, in this method, relatively large amounts of the silane are utilized.

It has now been found that even with the use of polyvinyl butyral films, at least an equally satisfactory effect is achieved by treating only the surface of the layers to be bonded with the silane, this treatment being conducted with the treating agent in the form of a solution.

In the case of partially acetalized polyvinyl alcohol films, the solution generally contains both a silicon-functional silane and an organo-functional silane. However, silicon-functional silanes can be used alone where lower pummel values are satisfactory, e.g., pummel values between 2 and 5. It is possible in this way to employ considerably lower amounts of silane than necessary in the process according to DAS No. 2,410,153.

The procedure of applying the silane in a solution to one of the boundary surfaces is especially advantageous where the film is a polyvinyl butyral film. The treatment reduces the effect of the water content of the plasticized polyvinyl butyral film on the desired adhesion to the glass so that it becomes practically insignificant. It is known that the adhesion of polyvinyl butyral films to glass becomes the lower, the higher their water content. In contrast thereto, the adhesion increases when the water content is reduced. By treating the surfaces of the polyvinyl butyral films with solutions of bond-strength-raising silanes, a constant adhesion value is attained over a wide range up to high water contents. Conversely, by a treatment with bond-strength-reducing silanes, a constant adhesion value is attained over a wide range down to low water contents.

It is furthermore known that plasticized polyvinyl butyral films generally exhibit a very high adhesion to glass, as desirable in the construction field, for example when the glass is used as structural window panes. In case of composite safety panes utilized as windshields in automotive vehicles, however, the bond strength displayed by the film with respect to the glass must be adjusted to a reduced value in a controlled fashion. For, if the adhesion is very strong and the pane is destroyed by an impact force, a penetration in the center of impact will occur without a large amount of glass being shattered. In case of very poor adhesion, the cause of impact, for example a falling body, will be elastically absorbed by the film, but the shattering effect is very high. In case of a direct collision with destruction of the windshield by the impact of a person's head, the film, on the other hand, is to gradually dissipate the kinetic energy by stretching. However, on the other hand, the destroyed glass is still to adhere sufficiently to the film that dangerous injuries by cuts are avoided. For this reason, the adhesive strength must be set in these cases optimally to a definite pummel adhesion value, which generally ranges between 2 and 5.

According to the invention, the silanes are used in solvents wherein they are readily soluble and which can be easily evaporated after the film treatment. Furthermore, the solvents must satisfactorily wet the plasticized synthetic resin films without dissolving same. Such properties are exhibited, for example, by aromatic hydrocarbons, such as toluene or xylene, light petroleum ethers, or also lower alkyl esters of lower aliphatic carboxylic acids, e.g., ethyl or butyl acetate.

The silane concentration in the solutions is 0.0001 to 10 percent by weight, preferably 0.0005 to 7.0 percent by weight, based on the solvent. The silicon-organofunctional silanes are generally utilized in amounts of 0.01 to 2 percent by weight, preferably 0.05 to 1.0 percent by weight. With the use of polyvinyl butyral films as the synthetic resin films, the concentration is preferably between 0.0005 to 5.0 parts by weight, based on 100 parts by weight of solvent. The silicon-functional silanes are generally employed in amounts of 1 to 10 percent by weight, preferably 2 to 7 percent by weight.

An advantageous way of using the silane is to dissolve or disperse the silane in a varnish. This form of utilization is also suitable, according to the invention, with the use of polyvinyl butyral films or polyvinyl chloride-containing films as the synthetic resin films.

As disclosed in co-pending application Ser. No. 738,402, suitable lacquer or varnish binding agents include non-hardening polymethacrylic or polyacrylic acid esters, soluble non-reactive polyurethanes, post-chlorinated polyvinyl chloride, copolymers of vinyl chloride-vinyl acetate-vinyl alcohol or of vinyl chloride-vinyl isobutyl ether. All of these binding agents are commercial products which are offered by various manufacturers as lacquer raw materials. This list is by no means comprehensive of all applicable bonding agents.

In addition to the materials set forth in co-pending application Ser. No. 738,402, other suitable varnish materials are those containing in the varnish binder proportions with free OH— and/or COOH— groups. This improved effect is especially apparent with the use of silanes which contain epoxy groups.

Co-pending application Ser. No. 738,402 discloses, as a lacquer or varnish binder having a reactive group, the partially saponified copolymer of vinyl chloride-vinyl acetate. Supplemental examples in this connection are also the following copolymers: vinyl chloride-hydroxyalkyl acrylate or vinyl chloride-vinyl acetate-unsaturated carboxylic acids (for example maleic, acrylic, or methacrylic acid), or vinyl chloride-unsaturated carboxylic acid alkyl ester-unsaturated carboxylic acids.

Since reactive groups, especially the COOH— group, affect light stability and thermostability, such copolymers consisting of different monomers are advantageously combined with other, inert binders, a prerequisite being that the latter are compatible with the reactive copolymers.

As supplemental examples for inert binders, worth mentioning are copolymers of vinyl chloride-vinyl acetate or vinyl chloride-carboxylic acid alkyl esters, or chlorinated natural or synthetic rubbers.

Among the nonvolatile components of the silane-containing varnishes are, besides the reactive and/or inert polymers, also plasticizers, stabilizers, and other auxiliary agents. The plasticizers used are dependent, with respect to type and amount, on the plasticized synthetic resin films. The total of nonvolatile components of the silane-containing varnish is between 1.0 and 20.0% by weight, preferably between 2.0 and 15.0% by weight.

Suitable volatile components in the varnishes are, as well-known to those skilled in the art, organic solvents or solvent mixtures wherein the nonvolatile components can be dissolved as a clear solution and leave clear films after evaporation. The proportion of plasticizer can range between 10 and 65 parts by weight, based on 100 parts by weight of polymer.

An especially advantageous binder when using polyvinyl butyral films as the synthetic resin films is plasticized polyvinyl butyral corresponding advantageously to the recipe of the plasticized polyvinyl butyral film employed. However, in principle, the other above-mentioned, film-forming binders are likewise usable, wherein it is of advantage if these contain free OH— or COOH—groups.

The silane concentration in the varnishes is 0.0001 to 7 percent by weight, preferably 0.0005 to 5 percent by weight, based on the varnish composition. The silicon-organofunctional silanes are generally utilized in amounts of 0.0001 to 5 percent by weight, preferably 0.0005 to 2 percent by weight. The silicon-functional silanes are generally used in quantities of 0.5 to 7% by weight, preferably 1 to 5% by weight. With the use of polyvinyl butyral films as the synthetic resin films, the silane concentrations range between 0.0001 and 2.0 parts by weight, preferably 0.0005 and 1.0 part by weight, based on the silane-containing varnish.

With the use of silanes containing epoxy groups, the silanes are contained in the varnish in amounts of 0.01–5% by weight, preferably 0.01–2% by weight. Silanes containing amino groups are utilized in amounts of 0.0001–2% by weight, preferably 0.0005–1% by weight.

The use of the silanes in a varnish of polymers of the above-mentioned groups also makes it possible to specifically set a desired adhesion value in the middle zone of the adhesion scale. If there are no OH or COOH— groups in the binder, a silicon-organofunctional silane which contains epoxy groups practically does not at all affect the pummel adhesion value. However, as soon as the binder contains small amounts of a polymer with hydroxy or carboxy groups, the pummel adhesion value is increased by a silicon-organofunctional silane with epoxy groups contained in the varnish. With a constant amount of silane in the varnish, one can obtain a definite and desired adhesion value by varying the relative quantity of inert binders to reactive binders. The use of a silane, especially an organofunctional silane, in a varnish for bonding partially acetalized polyvinyl alcohol, e.g., polyvinyl butyral, is also contemplated especially where lower pummel values are sufficient.

One practical method of effecting the process of this invention resides in applying the silane solution to at least one of the respective boundary surfaces of the individual layers, for example, by passing the plasticized synthetic resin films directly from a reel through the solution wherein the silane is present in a predetermined concentration and, thereafter, evaporating the solvent. The thus-treated film is not tacky and can be handled in the same way as untreated film.

Furthermore, one can treat the silicate glass panes, instead of the films, in the same or a similar manner. However, after the evaporation of the solvent, the silane will be present on the silicate surface as a moist film. In this case, the silane can be baked in, if desired, by means of a suitable heat treatment.

However, advantageously, the procedure in this case is to use a silane, dissolved in a solvent, together with a varnish binder. The silane-containing varnish is thinly applied to the silicate glass surfaces, either on one side or on both sides, for example by dipping, spraying, painting or the like, whereby during the subsequent drying of this varnish, an organophilic silicate glass surface is produced. The varnish can be applied continuously, for example by spraying, applying with a doctor blade, or printing. It can be subsequently dried in a continuous-type tunnel oven.

One can also apply the silane-containing varnish to the synthetic resin film used according to this invention. The application step can be conducted as in case of the solvent-diluted silanes, for example, continuously by means of a dip bath or by spraying or with a doctor blade, whereupon the film is squeezed between rolls and then dried in a tunnel oven. After application of the silane solutions or of the silane-containing varnish to the surface of one of the layers to be bonded together and after the solvent has been removed, the films to be bonded are superimposed in the desired sequence and optionally exposed to a preliminary bonding step, if desired, at an elevated temperature in a conventional manner, the laminate being suitably vented during this procedure. Thereafter, this preliminary bond is finally bonded under the effects of temperature and pressure, for example in an autoclave under pressures of about 2–20 kp./cm$^2$, preferable 8–15 kp./cm$^2$, and temperatures of between 120° C. and 170° C.

The silanes usable according to this invention are particularly suitable in the production of composite safety glass articles employing surface-refined silicate glass panes.

The suitable silanes are generally selected in correspondence with the chemical structure of the uppermost layer on the surface-refined silicate glass panes, considering the bond strength of the film to be utilized, as well as optionally also considering the varnish employed.

Preferred composite glass articles according to the invention comprise at least one layer of a soft or plasticized plastic film, treated in accordance with the invention, as the synthetic resin film. They can be manufactured with uncured, cured, planar, curved, vapor-deposited, imprinted, colored, etched, texturized silicate plate glass optionally containing a wire insert, as well as with colorless, colorfully transparent, colorfully opaque, imprinted, plasticized or soft plastic film treated according to the invention, optionally containing inserted wires, wire mesh, fabrics, or articles, such as, for example, solar cells.

The thicknesses of the silicate glasses and/or of the plasticized or soft plastic films treated in accordance with this invention can be selected to be variable depending on the purpose for which they are used. The number of individual layers of the composite article is likewise selectable as desired. This makes the article useful in the construction field in connection with doors and door systems, in windows and window constructions, in parapets for railings, balconies, or facades, in partitions as room dividers, balcony partitions, or lot enclosures, in connection with roofs or roof components of terraces, skylights, or greenhouses, in telephone booth or computer system enclosures, display cabinets, cashier's cages, prisons, or rooms endangered by explosion or implosion, in each case as safety glass for protection against penetration, break-in, shelling, fire, sound, cold, warmth, heat, optionally with alarm or heating wires, respectively.

In the vehicle sector, the articles can be used as window material in automotive vehicles, rail vehicles, ships, and airplanes in windshields, rear windows, or side windows, doors, partitions, etc.

the films was determined according to the pummel adhesion test method at −20° C., +23° C., +90° C.

| Example No. | Vinyl Acetate Content | Silane % by Weight | Dicumyl Peroxide | Pummel Adhesion Value at | | |
|---|---|---|---|---|---|---|
| | | | | −20° C. | +23° C. | +90° C. |
| 1 | 8% by Wt.(1) | None | None | 0 | 1 | 3 |
| 2 | " | 1% IMEO | " | 10 | 10 | 10 |
| 3 | " | 1% GLYMO | " | 4 | 10 | 10 |
| 4 | " | 1% VTEO | " | 0 | 0 | 0 |
| 5 | " | 1% VTEO | 0.1% by Wt. | 1 | 10 | 10 |
| 6 | " | 1% VTMO | " | 0 | 10 | 10 |
| 7 | " | 1% MEMO | " | 3 | 6 | 10 |
| 8 | 26% by Wt.(2) | None | None | 0 | 2 | 5 |
| 9 | " | 1% IMEO | " | 10 | 10 | 10 |
| 10 | " | 1% GLYMO | " | 10 | 10 | 10 |
| 11 | " | 1% VTEO | " | 0 | 0 | 0 |
| 12 | " | 1% VTEO | 0.1% by Wt. | 10 | 10 | 10 |
| 13 | " | 1% VTMO | " | 10 | 10 | 10 |
| 14 | " | 1% MEMO | " | 10 | 10 | 10 |

(1)Shore A Hardness = 97
(2)Shore A Hardness = 79
IMEO = γ-Imidazolylpropyltriethoxysilane
GLYMO = γ-Glycidyloxypropyltrimethoxysilane
VTEO = Vinyltriethoxysilane
VTMO = Vinyltrimethoxysilane
MEMO = γ-Methacryloxypropyltrimethoxysilane It is also contemplated to produce, with the plasticized or soft plastic films treated according to this invention, a composite product in combination with other transparent synthetic resins. Thus, visual structures can be created, for example, using in addition to silicate glass and plasticized or soft plastic film, as viscoelastic materials, polymethyl methacrylate, polycarbonate, polyethylene terephthalate, hard PVC, polyamide, and others, and as soft-elastic, tacky materials, polyurethanes, copolymers of ethylene, polyamides, polyepoxides, polysiloxanes, polymethacrylates, and others.

In order to more fully illustrate the invention by way of specific embodiments, the following examples are presented:

EXAMPLES 1-14

With the use of various copolymers of ethylene and vinyl acetate, films having a thickness of 0.4 mm. were produced and treated by dipping with silane solutions. Toluene was chosen as the solvent; this compound is capable of evaporation before the films treated therewith are further processed. The films were then placed between two glass plates; to remove air bubbles, the sandwich was then passed at room temperature through a pair of rubber rolls and thereafter treated in an autoclave at 12 bar and 170° C. for 1.5 hours so that a flawless composite glass was obtained. The glass adhesion of

EXAMPLES 15-22

The procedure of Examples 1-14 was followed, except that the autoclave step was conducted at 12 bar and 140° C. for 3 hours:

| Example No. | Vinyl Acetate Content | Silane % by Weight | Dicumyl Peroxide | Pummel Adhesion Value at | | |
|---|---|---|---|---|---|---|
| | | | | −20° C. | +23° C. | +90° C. |
| 15 | 26% by Wt.(1) | None | None | 0 | 2 | 5 |
| 16 | " | 1% IMEO | " | 10 | 10 | 10 |
| 17 | " | 1% GLYM0 | " | 10 | 10 | 10 |
| 18 | " | 1% VTEO | 0.1% by Wt. | 3 | 10 | 10 |
| 19 | 45% by Wt.(2) | None | None | 0 | 5 | 10 |
| 20 | " | 1% IMEO | " | 10 | 10 | 10 |
| 21 | " | 1% GLYMO | " | 10 | 10 | 10 |
| 22 | " | 1% VTEO | 0.1% by Wt. | 0 | 5 | 10 |

(1)Shore A Hardness = 79
(2)Shore A Hardness = 85
IMEO = γ-Imidazolylpropyltriethoxysilane
GLYMO = γ-Glycidyloxypropyltrimethoxysilane
VTEO = Vinyltriethoxysilane

EXAMPLES 23-27

The process took place analogously to Examples 1-14, but using the following films:

(1) Films of a copolymer of ethylene and acrylic acid butyl ester (commercially available under the name "Lupolen" A 2710 HX from BASF, Shore A hardness 87).

(2) Films of a quaternary polymer of ethylene, another olefin, acrylic acid, and acrylic acid esters (commercially available under the name "Lupolen" A 2910 MX, Shore A hardness 94).

| Example No. | Copolymer | Silane % by Weight | Pummel Adhesion Value at | | |
|---|---|---|---|---|---|
| | | | −20° C. | +23° C. | +90° C. |
| 23 | A 2710 HX | None | 0 | 1 | 7 |
| 24 | " | 1% IMEO | 10 | 10 | 10 |
| 25 | A 2910 MX | None | 10 | 10 | 10 |
| 26 | " | 1% ATAO | 10 | 10 | 10 |

-continued

| Example No. | Copolymer | Silane % by Weight | Pummel Adhesion Value at | | |
|---|---|---|---|---|---|
| | | | −20° C. | +23° C. | +90° C. |
| 27 | " | 5% ATAO | 1 | 5 | 5 |

IMEO = γ-Imidazolylpropyltriethoxysilane
ATAO = Isobutyltrimethoxysilane

EXAMPLES 28 and 29

In a supplement to Examples 15–17, silanes were used in varnishes rather than in a pure solvent:

With the use of a partially saponified copolymer of vinyl chloride and vinyl acetate with vinyl alcohol groups (obtainable commercially under the name "Vinylite" VAGH from Union Carbide Corporation), 25% by weight of diisodecyl phthalate as the plasticizer, based on the copolymer, a stabilizer system for the copolymer, and methyl isobutyl ketone as the solvent, varnish number 1 was prepared. The varnish contained 10% by weight of a binder (=copolymer+plasticizer+stabilizer) and 1% by weight of γ-imidazolylpropyltriethoxysilane (IMEO).

Furthermore, varnish number 2 was prepared with the use of the above-mentioned, plasticized, stabilized copolymer "Vinylite" VAGH and another copolymer, plasticized and stabilized in the same way, of vinyl chloride, vinyl acetate, and maleic acid (obtainable commercially under the name "Hostaflex" M 133 from Hoechst AG.). The quantitative ratio of the two copolymers VAGH: M 133 was 24:1, and the binder proportion was 15% by weight. The varnish contained furthermore 1% by weight of γ-glycidyloxypropyltrimethoxysilane (GLYMO).

These varnishes were used to treat, by dipping, films having a thickness of 0.4 mm. made of a copolymer of ethylene with 26% by weight vinyl acetate. After evaporation of the solvents, the thus-treated films were placed between two glass plates. The sandwiches were passed through a pair of rubber rolls for removal of air bubbles and then further processed in an autoclave at 12 bar and 140° C. for 3 hours, producing flawless composite glass. The film adhesion was determined according to the pummel adhesion test method:

| Example No. | Varnish No. | with | Silane % by Weight | Pummel Adhesion Value at | | |
|---|---|---|---|---|---|---|
| | | | | −20° C. | +23° C. | +90° C. |
| 28 | 1 | | 1% IMEO | 10 | 10 | 10 |
| 29 | 2 | | 1% GLYMO | 10 | 10 | 10 |

EXAMPLE 30

A copolymer of ethylene and 26% by weight vinyl acetate was used to produce films having a thickness of 0.4 mm. These films were treated with a 1% by weight solution of γ-imidazolylpropyltriethoxysilane (IMEO) in toluene as described in Example 16 and then processed into composite glass.

Furthermore, films having a thickness of 0.4 mm. and made of plasticized polyvinyl butyral (PVB) with a good adhesion characteristic (structural glass quality) was climatized to a moisture content of 0.45% by weight and likewise processed into composite glass.

Both types of composite glass were then subjected to a falling-ball test similar to DIN [German Industrial Standard] 52 306, at a temperature of +23° C. and at a temperature of −20° C. with the use of a steel ball of 227 g. The results are listed in Table 1. As can be seen from Table 1, when using plasticizer-free films of a copolymer of ethylene and 26% by weight vinyl acetate, it is possible to produce composite glass which is especially resistant to the effects of impacts under low temperatures, as compared to films made from plasticized polyvinyl butyral. The falling ball height without damage is approximately twice as high at a temperature of −20° C.

TABLE 1

| Temp. | Falling Height (m.) | 0.4 mm. Copolymer | | | 0.4 mm. PVB Film | | |
|---|---|---|---|---|---|---|---|
| | | Surface Crack (cm.) | Penetration | Splinter Weight (g.) | Surface Crack (cm.) | Penetration | Splinter Weight (g.) |
| +23° C. | 6 | None | None | 0.2 | — | — | — |
| | 7 | 2 | " | 3.3 | — | — | — |
| | 8 | 5 | " | 2.2 | — | — | — |
| | 8 | 2/1 | " | 1.2 | — | — | — |
| | 8 | 7 | " | 7.9 | None | None | 1.3 |
| | 9 | 10 | Yes | — | — | — | — |
| | 12 | — | — | — | 9/2 | None | 6.8 |
| | 13 | — | — | — | 12/4 | " | 6.2 |
| | 14 | — | — | — | 11 | Yes | — |
| | 16 | — | — | — | 12/6/2 | None | 7.5 |
| −20° C. | 5 | — | — | — | None | None | 0 |
| | 6 | None | None | 0.1 | " | " | 0.2 |
| | 7 | " | " | 0.3 | — | Yes | — |
| | 8 | 3 | " | 1.8 | — | — | — |
| | 10 | 3/1 | " | 2.0 | — | — | — |
| | 11 | 12/12/12 | " | 4.4 | — | — | — |
| | 12 | 12/5 | Yes | — | — | — | — |

EXAMPLES 31–39

Plasticized polyvinyl butyral film having a high glass adhesion (quality for structural glass, pummel adhesion value 10) was treated, by dipping, with solutions consisting of toluene as the solvent and various silanes in different concentrations. Thereafter, the solvent was removed by evaporation at room temperature. The differently treated films were climatized to a water content of 0.45%, placed between two glass plates, and heated so that a temperature of 90° C. could be measured on the glass surfaces. The warm sandwich was passed through a pair of rubber rolls to remove air bubbles. The thus-produced preliminary composite article was then treated in an autoclave at 12 bars and 140° C. for 3 hours, whereby a flawless composite glass was produced. The glass adhesion of the films was determined at −20° C. according to the pummel method:

| Example No. | Silane % by Weight | Pummel Adhesion Value at −20° C. | Example No. | Silane & by Weight | Pummel Adhesion Value at −20° C. |
|---|---|---|---|---|---|
| 31 | 0 ATAO | 10 | 10 | 0.1 MEMO | 4 |
| 32 | 0.5 ATAO | 10 | 11 | 1 MEMO | 0 |
| 33 | 1 ATAO | 10 | 12 | 5 MEMO | 0 |
| 34 | 2 ATAO | 7 | 13 | 0.1 SIFO | 1 |
| 35 | 3 ATAO | 5 | 14 | 5 SIFO | 0 |
| 36 | 5 ATAO | 3 | 15 | 0.1 GLFMO | 3 |
| 37 | 5.5 ATAO | 1 | 16 | 1 GLFMO | 0 |
| 38 | 6 ATAO | 1 | 17 | 0.1 ACTMO | 3 |
| 39 | 7 ATAO | 1 | 18 | 1 ACTMO | 1 |
|  |  |  | 19 | 5 ACTMO | 0 |

ATAO = Isobutyltrimethoxysilane
MEMO = γ-Methacryloxypropyltrimethoxysilane
SIFO = 2-[Triethoxysilyl]ethylphosphonic acid diethyl ester
GLFMO = 4-[Methyl-3'-(trimethoxysilyl)-propoxy]-1,3-dioxolane
ACTMO = [1-(Polyethylene/propylene glycol)-3-(trimethoxy-silyl)-propyl]-acetate

EXAMPLES 40–47

A plasticized polyvinyl butyral film with high glass adhesion (structural glass quality, pummel adhesion value 10) was treated with a solution of 3.0 and 5.5% by weight, respectively, of isobutyltrimethoxysilane (ATAO) in toluene; after evaporation of the solvent to differing water contents, the silanized film was climatized.

The composite glass was produced as described in Examples 1–19. For comparison purposes, a composite glass was produced with an untreated polyvinyl butyral film of the same quality and the same water content. The results can be seen from the following table:

| Example No. | ATAO % by Wt. | Water Content % by Weight | Pummel Adhesion Value at −20° C. ||
|---|---|---|---|---|
|  |  |  | Untreated Film | Treated Film |
| 40 | 5.5 | 0.31 | 10 | 1 |
| 41 | 5.5 | 0.41 | 10 | 1 |
| 42 | 5.5 | 0.64 | 7 | 1 |
| 43 | 5.5 | 0.82 | 4 | 1 |
| 44 | 3.0 | 0.32 | 10 | 5 |
| 45 | 3.0 | 0.41 | 10 | 5 |
| 46 | 3.0 | 0.61 | 7 | 2 |
| 47 | 3.0 | 0.82 | 4 | 1 |

EXAMPLES 48–50

Examples 31–39 were repeated except that the solvents were petroleum ether and xylene, instead of toluene, which were used for producing a 5% by weight solution with isobutyl trimethoxysilane (ATAO).

| Example No. | Solvent | Pummel Adhesion Value at −20° C. ||
|---|---|---|---|
|  |  | Untreated Film | Treated Film |
| 48 | Toluene | 10 | 3 |
| 49 | Petroleum ether | 10 | 4 |
| 50 | Xylene | 10 | 4 |

Analogously to Examples 31–39, a plasticized polyvinyl butyral film with a controlled adhesion to glass was utilized (quality for windshields, pummel adhesion value 2) was utilized and treated as described in Examples 1–30, and then processed to obtain a composite glass:

| Example No. | Silane % by Weight | Pummel Adhesion Value at −20° C. |
|---|---|---|
| 51 | 0 IMEO | 2 |
| 52 | 0.0005 IMEO | 2 |
| 53 | 0.001 IMEO | 3 |
| 54 | 0.002 IMEO | 3 |
| 55 | 0.004 IMEO | 6 |
| 56 | 0.006 IMEO | 6 |
| 57 | 0.008 IMEO | 7 |
| 58 | 0.01 IMEO | 10 |
| 59 | 0.02 IMEO | 10 |
| 60 | 0.03 IMEO | 10 |
| 61 | 0.04 IMEO | 10 |
| 62 | 0.001 AMEO | 2 |
| 63 | 0.005 AMEO | 6 |
| 64 | 0.01 AMEO | 6 |
| 65 | 0.05 AMEO | 10 |
| 66 | 0.006 GLYMO | 3 |
| 67 | 0.03 GLYMO | 4 |
| 68 | 0.09 GLYMO | 5 |
| 69 | 0.6 GLYMO | 5 |

IMEO = γ-Imidazolylpropyltriethoxysilane
AMEO = γ-Aminopropyltriethoxysilane
GLYMO = γ-Glycidyloxypropyltrimethoxysilane

EXAMPLES 70–73

A plasticized polyvinyl butyral film with controlled glass adhesion, as utilized in Examples 51–69 was treated with a solution of 0.01% by weight of γ-imidazolylpropyltriethoxysilane (IMEO) in toluene and, after evaporation of the solvent, climatized to differing water contents. The composite glass was produced as described in Examples 1–30:

| Example No. | Water Content % by Weight | Pummel Adhesion Value at −20° C. ||
|---|---|---|---|
|  |  | Untreated Film | Treated Film |
| 70 | 0.31 | 3 | 10 |
| 71 | 0.41 | 3 | 10 |
| 72 | 0.64 | 3 | 10 |
| 73 | 0.82 | 2 | 10 |

EXAMPLES 74–79

Plasticized polyvinyl butyral film having a high glass adhesion (quality for structural glass, pummel adhesion value 10) was utilized for the production of composite safety glass, with the use of metalized glasses, wherein the metalized sides of the glass were placed facing the polyvinyl butyral film, i.e. toward the inside. The polyvinyl butyral films had previously been treated with a solution of silane in toluene and had been climatized to a water content of 0.45%.

| Example No. | Glass Coating | Silane % by Weight | Pummel Adhesion Values at −20° C. | |
|---|---|---|---|---|
| | | | Untreated Film | Treated Film |
| 74 | Auresin(R)50/36 | 5 AMEO | 1 | 7 |
| 75 | Auresin(R)55/42 | 5 AMEO | 1 | 5 |
| 76 | Metallic 50/47 | 5 AMEO | 1 | 2 |
| 77 | Auresin(R)50/36 | 5 GLYMO | 1 | 3 |
| 78 | Auresin(R)55/42 | 5 GLYMO | 1 | 4 |
| 79 | Metallic 50/47 | 5 GLYMO | 1 | 3 |

AMEO = γ-Aminopropyltriethoxysilane
GLYMO = γ-Glycidyloxypropyltrimethoxysilane

EXAMPLES 80–87

Plasticized polyvinyl butyral film having a high glass adhesion and surface-coated glass were used for the production of a composite safety glass, as described in Examples 74–79, but a silane-containing varnish was employed. For this purpose, a solution was prepared from 2% by weight of plasticized polyvinyl butyral film and 1% by weight of silane. The solvent was a 1:4 mixture of dioxane and methyl isobutyl ketone. The polyvinyl butyral film (Examples 80–83) and/or the coated glass (Examples 84–87) were treated with this silane-containing varnish. Before the production of the composite article, the polyvinyl butyral film was climatized to a water content of 0.45%.

| Example No. | Glass Coating | Silane | Pummel Adhesion Value at −20° C. | |
|---|---|---|---|---|
| | | | Untreated Film | Treated Film |
| 80 | Calorex (R) | IMEO | 6 | 10 |
| 81 | Parelio (R) | IMEO | 6 | 10 |
| 82 | Calorex (R) | GLYMO | 6 | 10 |
| 83 | Parelio (R) | GLYMO | 6 | 10 |
| | | | Untreated Glass | Treated Glass |
| 84 | Calorex (R) | IMEO | 6 | 10 |
| 85 | Parelio (R) | IMEO | 6 | 10 |
| 86 | Calorex (R) | GLYMO | 6 | 10 |
| 87 | Parelio (R) | GLYMO | 6 | 10 |

IMEO = γ-Imidazolylpropyltriethoxysilane
GLYMO = γ-Glycidyloxypropyltrimethoxysilane

EXAMPLES 88–102

A mixture of 32 parts by weight of methyl isobutyl ketone, 23 parts by weight of isopropanol, and 34.2 parts by weight of toluene is combined with 8 parts by weight of a partially saponified copolymer of vinyl chloride and vinyl acetate with vinyl alcohol groups (commercially obtainable under the name of "Vinylite" VAGH from Union Carbide Corporation), 2 parts by weight of diisodecyl phthalate, 0.4 part by weight of a tin stabilizer (commercially available under the name of "Irgastab" 17M) and 0.4 part by weight of epoxidized soybean oil, thus forming a solution. The thus-produced primer is mixed with the amounts indicated in Table 1 of γ-imidazolylpropyltriethoxysilane (IMEO) and γ-aminopropyltriethoxysilane (AMEO) and γ-(β-aminoethyl)-aminopropyltrimethoxysilane (DAMO) and γ-glycidyloxypropyltrimethoxysilane (GLYMO), respective.

A plasticized film containing polyvinyl chloride is treated with this varnish by dipping, spraying, or printing, and the varnish solvent is thereafter removed by evaporation. The PVC films treated in this way are then placed between silicate glass and the thus-produced sandwich is passed in the cold state through a pair of rubber rolls to remove entrapped air and is then subjected to an autoclave treatment at 140° C. and under a pressure of 12 bar with a total running time of 1½ hours. The thus-obtained composite glass is tested for film adhesion according to the pummel adhesion test method at −20° C. The results can be seen from Table 2.

TABLE 2

| Example No. | Silane % by Weight | Pummel Adhesion Value at −20° C. |
|---|---|---|
| 88 | 1% AMEO | 10 |
| 89 | 1% DAMO | 10 |
| 90 | 1% IMEO | 10 |
| 91 | 0.5% IMEO | 10 |
| 92 | 0.05% IMEO | 10 |
| 93 | 0.01% IMEO | 10 |
| 94 | 0.005% IMEO | 6 |
| 95 | 0.001% IMEO | 4 |
| 96 | 0.0005% IMEO | 2 |
| 97 | 1% GLYMO | 10 |
| 98 | 0.5% GLYMO | 10 |
| 99 | 0.1% GLYMO | 6 |
| 100 | 0.05% GLYMO | 3 |
| 101 | 0.01% GLYMO | 1 |
| 102 | No Additive | 0 |

EXAMPLES 103–113

A mixture of 24 parts by weight of methyl isobutyl ketone, 43.5 parts by weight of xylene, and 24.8 parts by weight of cyclohexanone is combined with 3.41 parts by weight of a low-polymeric polymethyl methacrylate resin (commercially available under the name M 345 from Röhm), 1.46 parts by weight of a copolymer of vinyl chloride, vinyl acetate, and maleic acid (commercially available under the name "Hostaflex" M 133 from Hoechst AG.), 2.63 parts by weight of dioctyl adipate, and respectively 0.1 part by weight of the stabilizers mentioned in Examples 1–15, thus forming a solution. The thus-obtained primer is mixed with the amounts indicated in Table 3 of β-(3,4-epoxycyclohexyl)-ethyl-trimethoxysilane (ECHMO) and γ-glycidyloxypropyl-trimethoxysilane (GLYMO). The further processing steps took place analogously to Examples 88–102. The resultant adhesion test data are set forth in Table 3 below.

TABLE 3

| Example No. | Silane % by Weight | Pummel Adhesion Value at −20° C. |
|---|---|---|
| 103 | None | 0 |
| 104 | 0.2% ECHMO | 2 |
| 105 | 0.5% ECHMO | 10 |
| 106 | 0.8% ECHMO | 10 |
| 107 | 0.2% GLYMO | 2 |
| 108 | 0.5% GLYMO | 10 |
| 109 | 0.8% GLYMO | 10 |

For comparison purposes, the same primer was produced as set forth in Examples 103–109, except that it did not contain the copolymer of vinyl chloride, vinyl acetate, and maleic acid. This primer was mixed with the amounts of GLYMO indicated in Table 3, and the resultant product was further processed as set forth above. The results can be seen from Table 4.

TABLE 4

| Example No. | GLYMO % by Weight | Pummel Adhesion Value at −20° C. |
|---|---|---|
| 110 | 0.2 | 0 |
| 111 | 0.5 | 0 |
| 112 | 1.0 | 0 |
| 113 | 2.0 | 0 |

EXAMPLES 114–120

Example 106 was repeated, with the difference that the ratio of polymethyl methacrylate resin (PMMA): copolymer of vinyl chloride, vinyl acetate, and maleic acid (VC/VAc/MA) was varied in that the proportion of the polymethyl methacrylate resin was increased. The corresponding amounts can be seen from Table 5. The further processing steps were carried out analogously to Examples 103–109. The results can be seen from Table 5.

TABLE 5

| Example No. | Quantitative Ratio of the Polymers | | ECHMO % by Weight | Pummel Adhesion Value at −20° C. |
|---|---|---|---|---|
| | PMMA | VC/VAc/MA | | |
| 114 | 2.34 | 1 | 0.8 | 10 |
| 115 | 3.07 | 1 | 0.8 | 10 |
| 116 | 3.88 | 1 | 0.8 | 10 |
| 117 | 5.97 | 1 | 0.8 | 10 |
| 118 | 8.76 | 1 | 0.8 | 3 |
| 119 | 23.4 | 1 | 0.8 | 2 |
| 120 | 23. | 1 | None | 0 |

We claim:
1. A laminated safety glass consisting of
(a) at least one silica glass sheet;
(b) a plasticizer free soft film of a copolymer, said copolymer consisting essentially of ethylene and vinyl acetate, said copolymer having a vinyl acetate content of 8 to 45% by weight, said soft film having a Shore A hardness of 40 to 98, a number average of molecular weight determined in o-dichloro-benzene at 90° C. in a membrane osmometer between 20,000 and 100,000 melt flow index, as determined according to DIN 53 735, of between 0.1 and 20 g/10 minutes, and
(c) a bonding agent consisting essentially of a functional silane, said functional silane being selected from the group consisting of a silicon-organofunctional silane of the formula

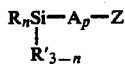

wherein
R is a hydrolyzable residue, R' is an alkyl residue of 1–18 carbon atoms; A is a bivalent alkylene residue of 1–10 carbon atoms which can be branched, and is a residue containing a functional group, which functional group is selected from the group consisting of

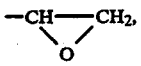

halogen, $NR^2R^3$ and

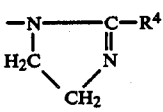

wherein
$R^2$ is selected from the group consisting of H and an amino alkyl of 2–8 carbon atoms in the alkyl residue; and $R^3$ is H and $R^2$; and $R^4$ is selected from the group consisting of H, $CH_3$ and $C_2H_5$; and n is 1 to 3 and p is 0 or 1, and a siliconfunctional silane of the formula

wherein
R' is identical or different, saturated, unbranched or branched alkyl residues of 1–18 carbon atoms, R is selected from the group consisting of halogen, identical or different saturated alkoxy groups of 1–8 carbon atoms and an acyl residue linked to the Si atom via an oxygen atom, and wherein n is 1 to 3.
2. A laminated safety glass according to claim 1 wherein said silane is a silicon organofunctional silane.
3. A laminated safety glass according to claim 1, wherein said silane is a silicon functional silane.
4. A laminated glass according to claim 1 wherein said plasticizer free soft film is disposed between a pair of silica glass sheets and laminated to said silica glass sheets by said functional silane.
5. A laminated safety glass according to claim 2 wherein said silicon-organofunctional silane is present between the plasticizer free soft film and the silica glass sheet in an amount of 0.0001 to 5 weight percent.
6. A laminated safety glass according to claim 2 wherein said silicon-organofunctional silane is present in an amount of 0.0005 to 2 weight percent.
7. A laminated safety glass according to claim 1 wherein said silane is δ-glycidyloxypropyltrimethoxysilane.
8. A laminated safety glass according to claim 1 wherein said silane is δ-imidozolylpropyltriethoxysilane.
9. A laminated safety glass according to claim 1 wherein the functional silane is in a solution and the silane concentration in the solution is 0.0001 to 10 percent by weight.
10. A laminated safety glass according to claim 1 wherein the functional silane is in a solution and the silane concentration in the solution is 0.0005 to 7.0 percent by weight.
11. A laminated safety glass according to claim 1 wherein said silicon-function silane is present in an amount of 0.5 to 7 weight percent.
12. A laminated safety glass according to claim 1 wherein said silicon-function silane is present in an amount of 1 to 5 weight percent.
13. A laminated safety glass according to claim 1 wherein the functional silane is in a varnish and the silane concentration in the varnish is 0.0001 to 7 percent by weight.

14. A laminated safety glass according to claim 1 wherein the silane is in a varnish and the silane concentration in the varnish is 0.0005 to 5 percent by weight.

15. A laminated safety glass according to claim 1 wherein said silicon-organofunctional silane contains epoxy groups and said silane is contained in a varnish, the silane being present in an amount of 0.01 to 5 percent by weight.

16. A laminated safety glass according to claim 1 wherein said silicon-organofunctional silane contains epoxy groups, and said silane is contained in a varnish, the silane being present in an amount of 0.01 to 2 percent by weight.

17. A laminated safety glass according to claim 1 wherein said silicon-organofunctional silane contains amino groups, and said silane is contained in a varnish, the silane being present in an amount of 0.0001 to 2 percent by weight.

18. A laminated safety glass according to claim 1 wherein said silicon-organofunctional silane contains amino groups, and said silane is contained in a varnish, the silane being present in an amount of 0.0005 to 1 percent by weight.

* * * * *